(12) United States Patent
Allen et al.

(10) Patent No.: US 11,186,971 B1
(45) Date of Patent: Nov. 30, 2021

(54) AUXILIARY VALVE FOR HYDRANT

(71) Applicant: Mueller International, LLC, Atlanta, GA (US)

(72) Inventors: Sean Michael Allen, Chattanooga, TN (US); Justin Blaine Childress, Albertville, AL (US); Christopher Joseph Duckett, Albertville, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/887,851

(22) Filed: May 29, 2020

(51) Int. Cl.
| | | |
|---|---|---|
| *E03B 9/04* | (2006.01) | |
| *A62C 35/20* | (2006.01) | |
| *F16K 27/00* | (2006.01) | |
| *F16K 1/30* | (2006.01) | |
| *E03B 9/02* | (2006.01) | |

(52) U.S. Cl.
CPC ............... *E03B 9/04* (2013.01); *A62C 35/20* (2013.01); *F16K 27/006* (2013.01); *E03B 2009/022* (2013.01); *F16K 1/304* (2013.01)

(58) Field of Classification Search
CPC ......... E03B 9/04; A62C 35/20; F16K 27/006; Y10T 137/701
See application file for complete search history.

(56) References Cited

U.S. PATENT DOCUMENTS

| 795,057 | A | | 7/1905 | O'Brien | |
|---|---|---|---|---|---|
| 2,019,919 | A | * | 11/1935 | Lofton | E03B 9/02 137/298 |
| 2,032,881 | A | * | 3/1936 | Lofton | E03B 9/02 137/298 |
| 6,058,957 | A | * | 5/2000 | Honigsbaum | E03B 9/02 137/1 |
| 2012/0004866 | A1 | * | 1/2012 | Plouffe | E03F 7/00 702/50 |

OTHER PUBLICATIONS

Image of US Pipe High Pressure Hydrant Valve Assembly, publicly available prior to May 29, 2020, 1 pg.

* cited by examiner

*Primary Examiner* — Kevin R Barss
(74) *Attorney, Agent, or Firm* — Taylor English Duma LLP

(57) ABSTRACT

A valve assembly for a hydrant can include a main valve defining a bore; and an auxiliary valve assembled to and extending through the bore of the main valve, the auxiliary valve defining a fluid channel through the auxiliary valve, the auxiliary valve including: an upper auxiliary valve shaft; a lower auxiliary valve shaft, the upper auxiliary valve shaft movable in a vertical direction with respect to the lower auxiliary valve shaft, a position of the lower auxiliary valve shaft restrained with respect to a position of the upper auxiliary valve shaft within a predetermined movement range; and a sealing element preventing fluid flow through the fluid channel.

20 Claims, 8 Drawing Sheets

AUXILIARY VALVE FOR HYDRANT

TECHNICAL FIELD

Field of Use

This disclosure relates to hydrants. More specifically, this disclosure relates to auxiliary valves for hydrants, including those configured to ease opening of the main valves of the hydrants.

Related Art

A fluid distribution system such as a municipal water system can comprise a hydrant that can permit ready and reliable above-ground access to water by authorized personnel. The dry barrel hydrant as defined here can be installed partly below and partly above the ground surface and is typically supplied with water by a substantially horizontal pipe connected to the hydrant and sometimes referred to as a "lateral" pipe extending from a "main" water pipe. A stem assembly, typically comprising a lower stem and an upper stem connected to each other with a coupling, is positioned inside the hydrant and can extend from an operating nut at a top of the hydrant to a main valve near the bottom of the hydrant. The main valve can allow water into or keep water out of the exposed part of the hydrant.

Fluid in the fluid distribution system can be pressurized. This pressurized fluid can cause a pressure differential between the fluid pressure acting on a lower surface of the main valve and normal atmospheric pressure on an upper surface of the main valve inside the hydrant above the main valve, which is typically filled with air or unpressurized fluid. An operator can therefore experience difficulty in rotating the operating nut and opening the main valve due to high operating torque requirements to overcome the pressure differential.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve assembly for a hydrant, the valve assembly comprising: a main valve defining a bore; and an auxiliary valve assembled to and extending through the bore of the main valve, the auxiliary valve defining a fluid channel through the auxiliary valve, the auxiliary valve comprising: an upper auxiliary valve shaft; a lower auxiliary valve shaft, the upper auxiliary valve shaft movable in a vertical direction with respect to the lower auxiliary valve shaft, a position of the lower auxiliary valve shaft restrained with respect to a position of the upper auxiliary valve shaft within a predetermined movement range; and a sealing element preventing fluid flow through the fluid channel.

In a further aspect, disclosed is a hydrant comprising: a hydrant body defining an inlet and an outlet and an internal cavity extending from the inlet to the outlet, the inlet connectable to a fluid supply; and a valve assembly defining a first end and a second end, the valve assembly comprising: a main valve defining a first side and a second side, the main valve configured to prevent flow of a fluid of the fluid supply to the internal cavity from an area in fluid communication with the second end of the valve assembly; an auxiliary valve assembled to and extending through the main valve, the auxiliary valve defining a fluid channel therethrough, the auxiliary valve comprising: an upper auxiliary valve shaft; and a lower auxiliary valve shaft, the upper auxiliary valve shaft movable within a predetermined range of movement in a vertical direction with respect to the lower auxiliary valve shaft.

In yet another aspect, disclosed is a method of using a hydrant, the method comprising: moving an upper auxiliary valve shaft of an auxiliary valve of the hydrant in a vertical direction with respect to a lower auxiliary valve shaft of the auxiliary valve of the hydrant; and opening a fluid channel defined in the auxiliary valve, the auxiliary valve extending through a main valve of the hydrant and a fluid of the system able to thereby flow through the auxiliary valve.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
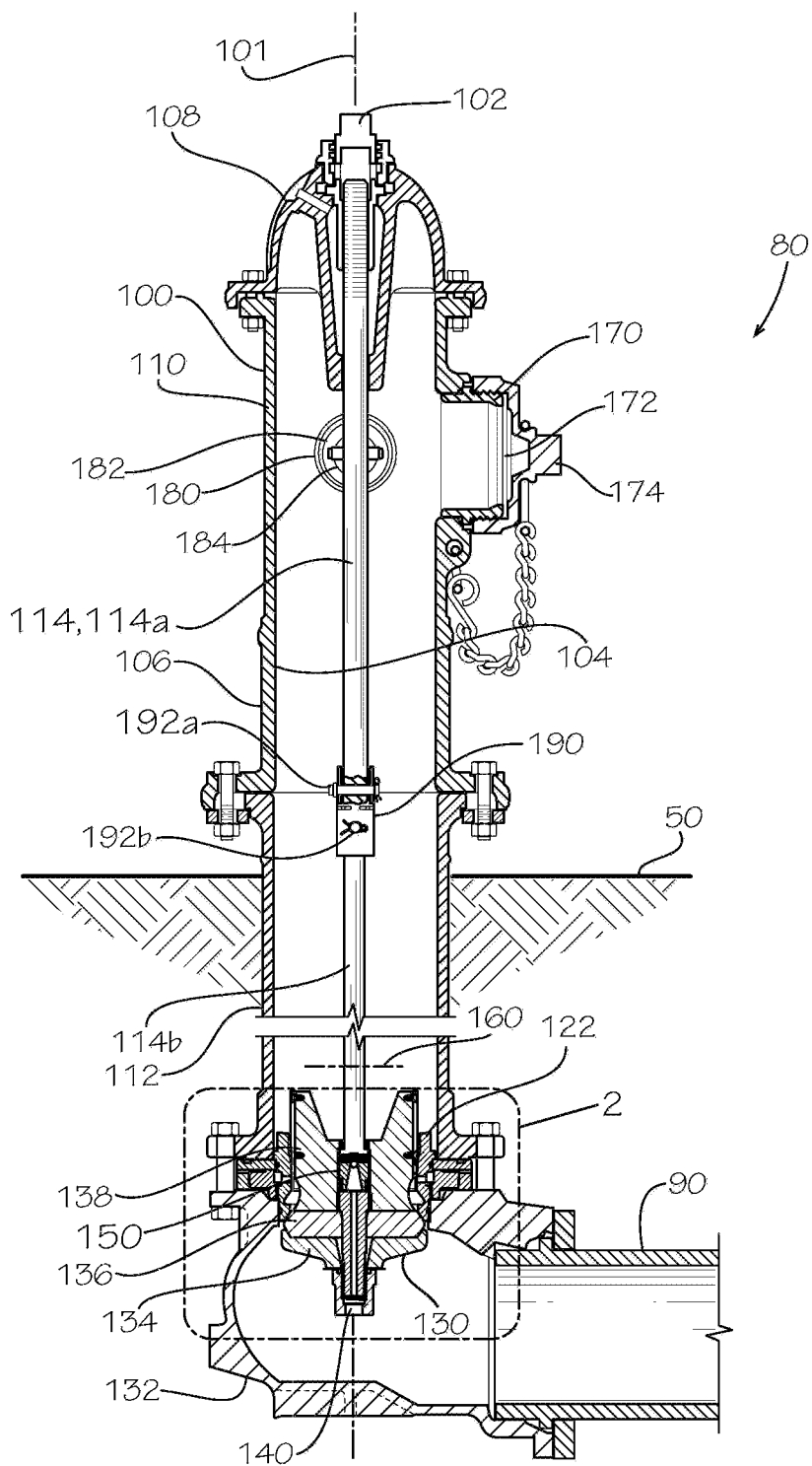
FIG. 1 is a sectional view of a hydrant installed in the ground and comprising a valve assembly in accordance with one aspect of the current disclosure, taken from a vertical plan extending along an axis of the hydrant.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "left" is that which is to the left of or facing left from a center of the structure shown in FIG. 1 or any portion thereof; and "right" is that which is to the right of or facing right from the same reference point. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, an auxiliary valve and associated methods, systems, devices, and various apparatuses are disclosed herein. In one aspect, the auxiliary can comprise an upper auxiliary valve shaft and a lower auxiliary valve shaft.

Hydrants, sometimes more specifically referred to as fire hydrants, can be used in a municipal—or any—water system for the purpose of extinguishing fires and dispensing water for other purposes. A hydrant, however, can also be used to dispense fluids other than water. Fire hydrants commonly are one of two types: wet-barrel and dry-barrel. In a wet-barrel hydrant, water typically remains in a body of the hydrant at all times because the main valve is commonly situated near the top of the body of the hydrant. In a dry-barrel fire hydrant, the water is drained from the hydrant body when a main valve of the hydrant is closed. More specifically, the main valve can be mounted on or housed in a hydrant shoe at a lower end of the body of the hydrant.

FIG. 1 is a sectional view of a hydrant 100 installed in the ground and comprising a valve assembly 130 in accordance with one aspect of the current disclosure. As shown in FIG. 1, a fluid distribution system 80 can comprise the hydrant 100 and a pipe 90, which can be connected to the hydrant 100. The fluid distribution system 80 and the hydrant 100 can be installed partly below and partly above a ground surface 50. In some aspects, the hydrant 100 can be a dry-barrel fire hydrant comprising a hydrant body 106 defining an internal cavity 104. The internal cavity 104 of the hydrant body 106 can extend from an inlet of the hydrant 100, which can be a hydrant shoe 132, and an outlet of the hydrant 100, from which the fluid of the fluid distribution system 80 can be drawn.

The hydrant body 106 can comprise an upper hydrant barrel 110, a bonnet 108 secured to a top end of the upper hydrant barrel 110, and a lower hydrant barrel 112 secured to a bottom end of the upper hydrant barrel 110. The hydrant 100 can further comprise the hydrant shoe 132 secured to a bottom end of the lower hydrant barrel 112. The hydrant shoe 132 can be secured to a fluid supply comprising a water supply pipe such as the pipe 90 or another fluid supply pipe. An operating nut 102 can be mounted on, in, or through the bonnet 108 and along a central axis 101. A stem 114 can be secured to the operating nut 102 via a threaded connection and can be positioned within and centered within the internal cavity 104 along a central axis 101. The stem 114 can comprise an upper stem 114a and a lower stem 114b. The stem 114 can further comprise a stem coupling 190. In some aspects, the stem coupling 190 can join the upper stem 114a and the lower stem 114b with fasteners 192a,b. In some aspects, the fasteners 192a,b can comprise clevis pins and cotter pins, respectively. In some aspects, the fasteners 192a,b used to secure the upper stem 114a to the lower stem 114b can be another type of fastener such as, for example and without limitation, weldments, screws, or bolts. In some aspects, the stem 114 can be a single-piece or monolithic unit or component.

In some aspects, one or more of the upper stem 114a, the lower stem 114b, and the stem coupling 190 can be circular in radial cross-section. In some aspects, one or more of the upper stem 114a, the lower stem 114b, and the stem coupling 190 can define a non-circular shape in radial cross-section. In some aspects, as shown, the stem 114 can be solid. In some aspects, the stem 114 can extend from a top end of the hydrant 100 to the valve assembly 130.

The valve assembly 130 can be coupled to or integrated into the lower stem 114b, or vice versa as shown. The valve assembly 130 can comprise a main valve 136, which can be a disc or a plate, and an auxiliary valve 150 and can be held in place with a cap nut 140. The valve assembly 130 can further comprise a first valve body or upper valve body 138 and a second valve body or lower valve body 134. In some aspects, as shown, a portion of the valve assembly 130 or the auxiliary valve 150 and specifically an upper auxiliary valve shaft 210 (shown in FIG. 2) thereof can be formed monolithically with the lower stem 114b. In other aspects, the valve assembly 130 can be coupled to the lower stem 114b by a fastener such as, for example and limitation, a stem pin or a second stem coupling 190 together with a second set of the fasteners 192a,b at a fastening location 160. In some aspects, the valve assembly 130 can be coupled to the lower stem 114b by another type of fastener such as, for example and without limitation, weldments, screws, bolts, or a threaded connection between the lower stem 114b and the valve assembly 130. In some aspects, the stem 114— including the upper stem 114a and the lower stem 114b— can be a single-piece or monolithic unit or component.

As shown, the upper hydrant barrel 110 can comprise a pumper nozzle 170 defining a pumper nozzle outlet 172 and a hose nozzle 180 defining a hose nozzle outlet 182. The pumper nozzle outlet 172 can be covered by a pumper nozzle cap 174 and the hose nozzle outlet 182 can be covered by a hose nozzle cap 184. The pumper nozzle cap 174 and the hose nozzle cap 184 can be removable for attachment of a pumper and a hose, respectively, to the hydrant 100. The pumper nozzle 170 and the hose nozzle 180 can define a threaded connection, a Storz connection (i.e., a non-threaded quarter-turn connection), or any other connection.

Figure 2:
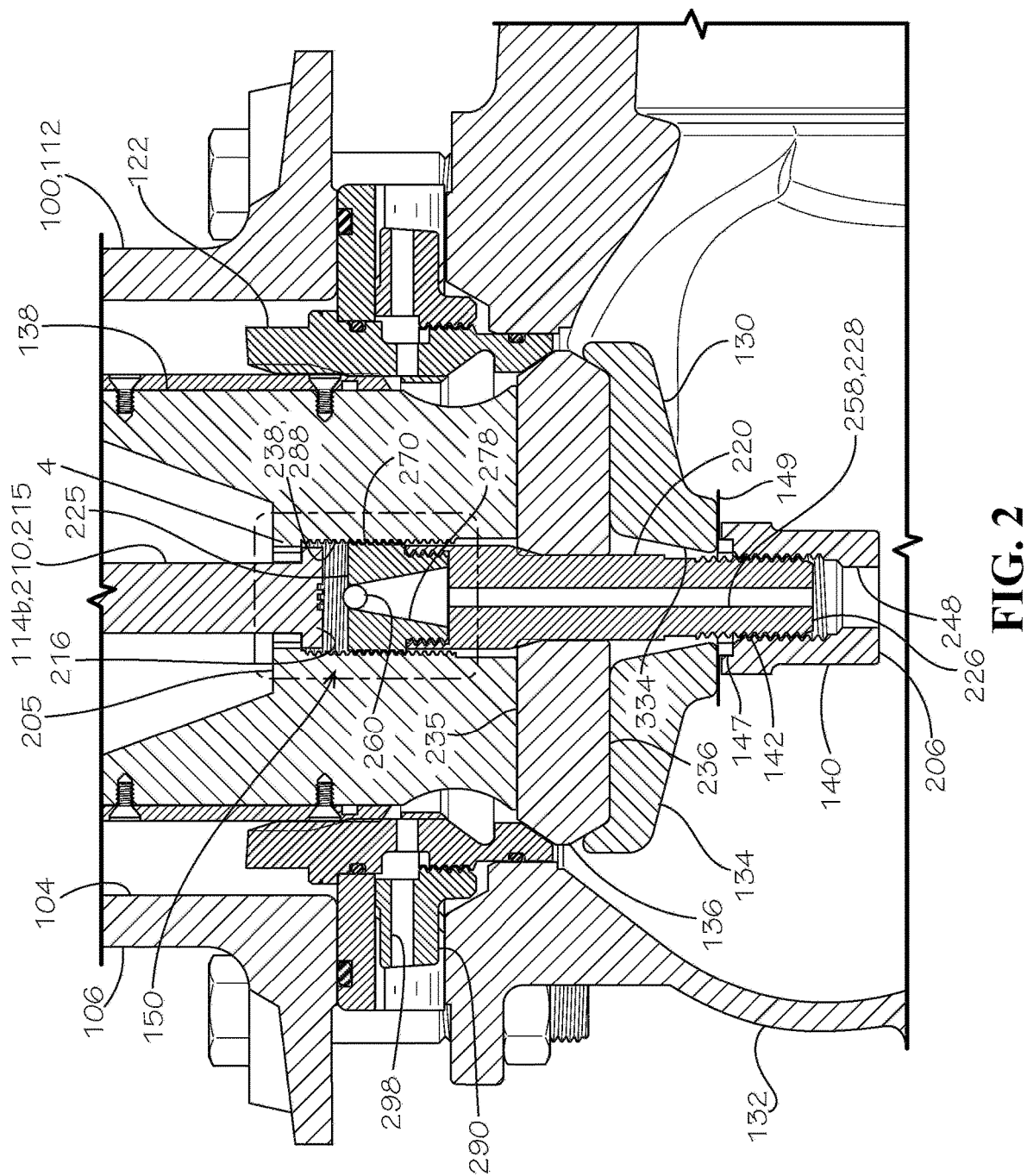
FIG. 2 is a detail sectional view of the valve assembly of FIG. 1 taken from detail 2 of FIG. 1, the valve assembly comprising a main valve and an auxiliary valve.

FIG. 2 is a detail sectional view of the valve assembly 130. As shown in FIG. 2, the valve assembly 130 and, more specifically, the auxiliary valve 150 can comprise a first auxiliary valve shaft or an upper auxiliary valve shaft 210 and a second auxiliary valve shaft or a lower auxiliary valve shaft 220. The auxiliary valve 150 can further comprise the upper valve body 138, the cap nut 140, a washer 149, a seal 147, which can be positioned between the cap nut 140 and the mating structure, and any other component of the valve assembly 130 that is able to facilitate or support operation of the auxiliary valve 150. In some aspects, the washer 149 can be positioned between the cap nut 140 and the lower valve body 134 to facilitate a secure connection therebetween. Each of the upper auxiliary valve shaft 210 and the lower auxiliary valve shaft 220 can define a respective first end 215,225 and a second end 216,226.

The upper valve body 138 can be positioned at and also define a first end or upper end 205 of the valve assembly 130, and the cap nut 140 can be positioned at and also define a second end or lower end 206 of the valve assembly 130. Either or, as shown, both of the upper valve body 138 and the cap nut 140 can hold together individual components of the valve assembly 130. More specifically, in some aspects, the cap nut 140 can be assembled to the lower auxiliary valve shaft 220 by threading 142. In other aspects, the cap nut 140 can be assembled to the lower auxiliary valve shaft 220 by another fastening method. In some aspects, the main valve 136 and the lower valve body 134 can be held between the upper valve body 138 and the cap nut 140. In some aspects, the valve assembly 130 can be mounted to the stem 114 by other methods such as, for example and without limitation, fasteners, brackets, threading, welding, or gluing (e.g., with adhesive) on the upper valve body 138 or the lower valve body 134. The hydrant 100 can comprise a seat ring 122, against which the main valve 136 can seal to close the hydrant 100, thereby preventing fluid inside the fluid distribution system 80 from flowing from the pipe 90 (shown in FIG. 1) into the internal cavity 104 of the hydrant body 106. In some aspects, the main valve 136 can be as shown. In some aspects, the main valve 136 can comprise a rigid insert providing further rigidity to the main valve 136, including against higher pressures of the fluid in the system 80.

To open the hydrant 100, which can allow water to flow from the pipe 90 into the internal cavity 104 of the hydrant body 106, the operating nut 102 can be turned or rotated. Rotating the operating nut 102 in one direction can cause vertical movement of the stem 114. Rotating the operating nut 102 in one direction can, as will be described in further detail below, separately actuate or open the auxiliary valve 150 and actuate or open the main valve 136 and the valve assembly 130 as a whole. As noted above, though, based on a pressure of the fluid inside the fluid distribution system 80 acting on a lower surface of the main valve 136 and also a surface area of the valve assembly 130 comprising the main valve 136 and surrounding structure, an operator can experience difficulty in rotating the operating nut 102 and opening the main valve 136 due to a resulting higher operating torque requirement. In some aspects, for example and without limitation, opening the main valve 136 defining a nominal six-inch diameter on a portion of the system 80 measuring a fluid pressure of 75 psi can require about 2000 pounds of force. Utility technicians often use a large, extended or elongated wrench (elongated, for example, with a "cheater bar") to operate or open the hydrant 100, but such a tool can be cumbersome or interfere with surrounding structure and can cause damage by "over-closing" or "over-opening" of the main valve 136 resulting from rotating the operating nut 102 too far in one direction. The auxiliary valve 150, in contrast, can lower the operating torque requirement by allowing at least some fluid pressure equalization across the valve assembly 130 and the main valve 136 before opening the main valve 136.

More specifically, to operate the main valve 136 in a typical configuration of the hydrant 100 without the improvements disclosed herein, rotation of the operating nut 102 can lower the stem 114. Because movement of the stem 114 in such a hydrant will immediately cause a corresponding movement in each portion of the valve assembly 130, the main valve 136 will also at the same time be moved away from the seat ring 122. To discontinue water flowing from the pipe 90 to the hydrant body 106, the operating nut 102 can be turned in the opposite direction, raising the stem 114 and thereby moving the main valve 136 towards the seat ring 122 such that the main valve 136 engages the seat ring 122. The hose nozzle outlet 182 and the pumper nozzle outlet 172 can be thereby at least indirectly sealable by the main valve 136. Movement of the stem 114 and the valve assembly 130, however, need not be synchronous. As will be described, all of the components of the valve assembly 130 need not move simultaneously and together with the stem 114) during all conditions of hydrant operation.

As shown, the main valve 136 can define a first side or upper side 235 and a second side or lower side 236 and a bore 336 (shown in FIG. 3) extending from and defined in the first side 235 to the second side 236. The main valve 136 can be generally configured to prevent flow of the fluid of the fluid supply from an area in fluid communication with the second side 236 to the internal cavity 104 of the hydrant 100. The auxiliary valve 150 or any portion thereof can be assembled to and can extend through the bore 336 of the main valve 136 and, as shown, through the entire valve assembly 130. The auxiliary valve 150 can define a fluid channel 258 through the auxiliary valve 150. The fluid channel 258 can extend from the first end 215 of the upper auxiliary valve shaft 210 to the second end 226 of the lower auxiliary valve shaft 220 and any distance therebetween. The upper auxiliary valve shaft 210 can be aligned with, positioned above, and movable in a vertical direction along the axis 201 with respect to the lower auxiliary valve shaft 220. A position of the lower auxiliary valve shaft 220 can be restrained with respect to a position of the upper auxiliary valve shaft 210 within a predetermined range of movement. In some aspects, the upper auxiliary valve shaft 210 can extend through and be restrained by the upper valve body 138.

The auxiliary valve 150 can further comprise a sealing element 260, which can be configured to prevent fluid flow through an entrance of the fluid channel 258 to and from the internal cavity 104 of the hydrant body 106. In some aspects, as shown, the sealing element 260 can seal an entrance of a downstream portion 228 of the fluid channel 258 defined in the lower auxiliary valve shaft 220, as it would be expected to do as long as a pressure of the fluid in the system 80 and below the sealing element 260 is higher than a pressure of the fluid above the sealing element 260. More specifically, the sealing element 260 can seal a bore or upper downstream portion 278 defined in a valve housing or valve fitting 270. The valve fitting 270 can form or define a portion of the lower auxiliary valve shaft 200 including the first end 225 and can in some aspects be formed monolithically with the lower auxiliary valve shaft 200. In some aspects, the sealing element 260 can seal an entrance of a midstream portion 238, a downstream portion 248, and a downstream portion 278 of the fluid channel 258 defined in the upper valve body 138, the cap nut 140, and the valve fitting 270. Each of the fluid channel portions 228,238,248, 278 of the fluid channel 258 can be a bore comprising the fluid channel portion 258 and defined in the respective components. The fluid channel 258 and any portion thereof can define a hole, a passage, or any other space for movement of the fluid of the system 80.

As shown, the lower auxiliary valve shaft 220 can be secured to the upper valve body 138 with threading 288 defined in the midstream portion 238 of the fluid channel 258. The upper auxiliary valve shaft 210 can in contrast be movable in a vertical direction along the central axis 101 with respect to the upper valve body 138 and the lower auxiliary valve shaft 220. As also shown, the lower auxiliary valve shaft 220 can extend through the main valve 136. In some aspects, the valve assembly 130 can comprise the aforementioned upper valve body 138, which can be positioned adjacent to the first side 235 of the main valve 136.

The hydrant 100 can be a "draining" hydrant as shown. More specifically, for example and without limitation, the hydrant 100 or a portion thereof can define passages such as drain passages 298 in a drain ring 290. Such passages can facilitate drainage from the hydrant 100 any of the fluid of the system 80 that has passed into the internal cavity 104 of the hydrant 100 even when the main valve 136 is closed. Passages such as the drain passages 298—or a quantity or position of same—can be adjusted to allow more or less flow of the fluid as desired and can be configured to adjust or terminate such flow by incorporating a valve or similar structure. In some aspects, a non-draining hydrant 100 as shown in FIG. 1, which does not define the drain passages 298, can fill up more easily or quickly with the fluid of the system 80 and thereby increase the rate at which a pressure of the fluid inside the internal cavity 104 offsets a pressure of the fluid on an opposite or lower side of the main valve 136 and the valve assembly 130. As the pressure of the fluid in the internal cavity 104 of the hydrant 100 begins to offset the pressure of the fluid on the lower side of the valve assembly 130 such as by operation of the auxiliary valve 150, opening of the main valve 136 can require the application of less torque at the operating nut 102—sometimes called the operating torque—or otherwise require less effort by a user to open an opening mechanism of the main valve 136. In some aspects, a reduction in the operating torque can result from simply increasing a height of the fluid inside the internal cavity 104. In some aspects, a reduction in the operating torque can result from completely filling the internal cavity 104 with the fluid and building up a pressure thereof inside the internal cavity 104.

Figure 3:
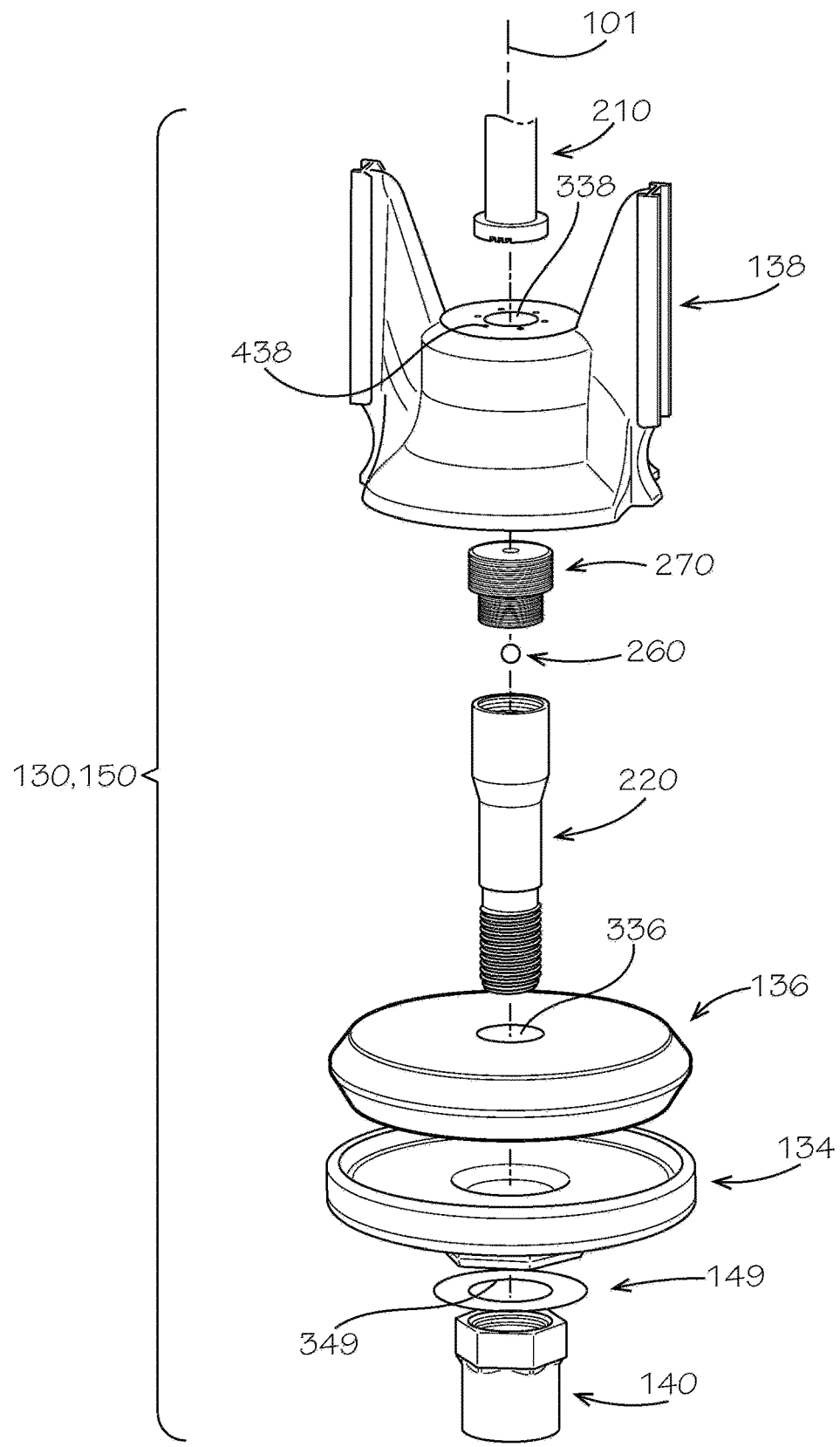
FIG. 3 is an exploded view of the valve assembly of FIG. 1.

FIG. 3 is an exploded view of the valve assembly 130, which can comprise the auxiliary valve 150. As shown, as many as all of the upper auxiliary valve shaft 210, the lower auxiliary valve shaft 220, the valve fitting 270, the sealing element 260, the upper valve body 138, the main valve 136, the lower valve body 134, the washer 149, and the cap nut 140 can be aligned along the central axis 101—and, optionally, in the order shown. In some aspects, as shown, the upper valve body 138 can define a bore 338 and one or more upstream portions 438 of the fluid channel 258 (shown in FIG. 2), the main valve 136 can define a bore 336, the lower valve body 134 can define a bore 334 (shown in FIG. 2), the washer 149 can define a bore 349, and the cap nut can define the downstream portion 248 (of the fluid channel 258), which can be a bore. As shown, the valve assembly 130 and specifically the upper valve body 138 can define as many as six or more upstream portions 438 of the fluid channel 258 extending through the upper valve body 138.

In some aspects, any of the upper auxiliary valve shaft 210, the lower auxiliary valve shaft 220, the valve fitting 270, the sealing element 260, the upper valve body 138, the main valve 136, the lower valve body 134, the washer 149, and the cap nut 140 or portions of any one or more of the components of the valve assembly 130 and, more specifically, the auxiliary valve 150 can define a toroid shape or a cylindrical shape and can define one or more cylindrical or conical surfaces on interior or exterior portions thereof.

Figure 4:
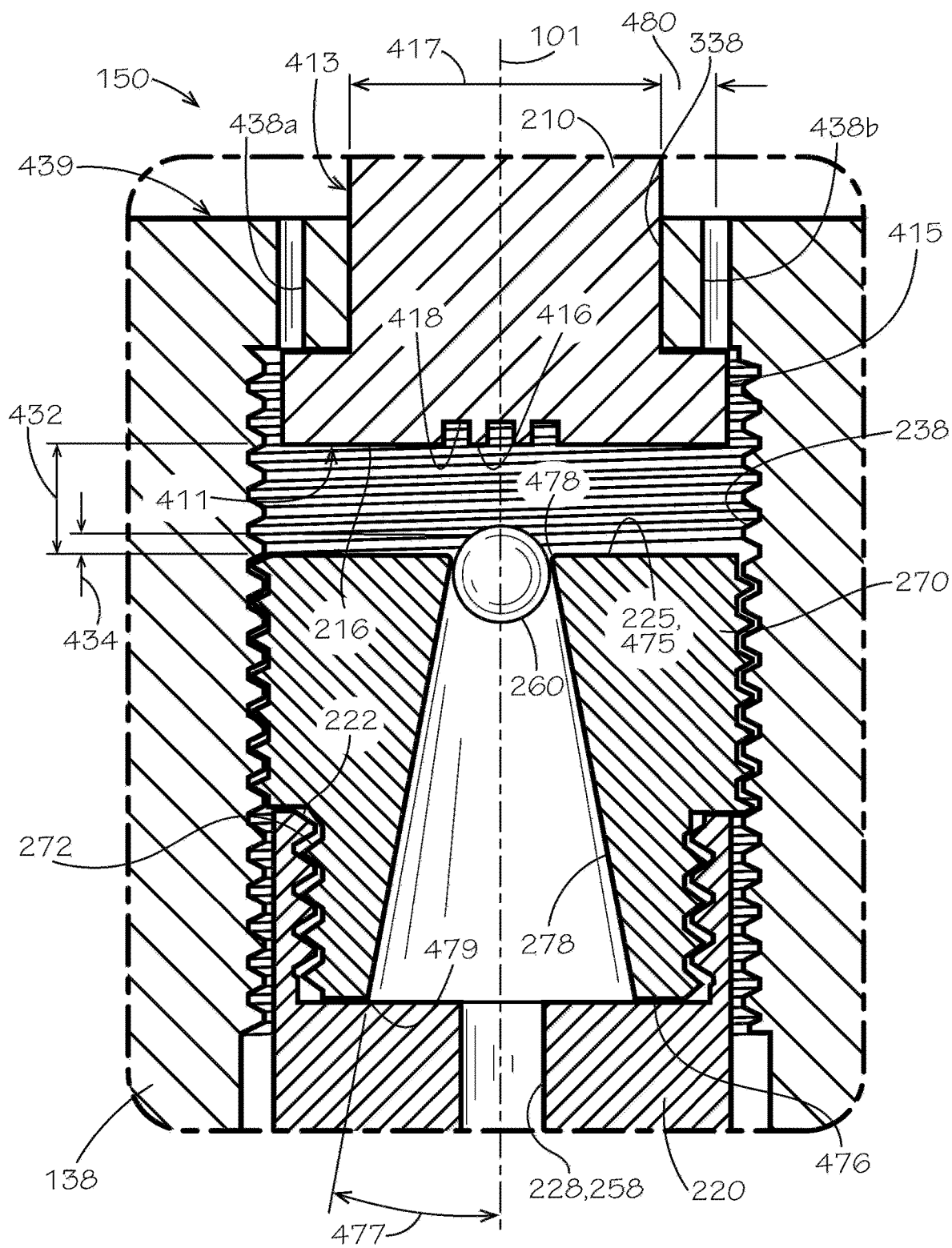
FIG. 4 is a detail sectional view of an auxiliary valve of the valve assembly of FIG. 1 taken from detail 4 of FIG. 1 showing the auxiliary valve in a closed condition.

FIG. 4 is a detail sectional view of the auxiliary valve 150 of the valve assembly 130 (shown in FIG. 2) showing the auxiliary valve 150 in a closed condition or position. In some aspects, as shown, a first end 225 of the lower auxiliary valve shaft 220 and a first end 475 of the valve fitting 270 can define a first end or opening 478 of the downstream portions 228,278 of the fluid channel 258, and this opening can be smaller in diameter than a second end or opening 479 of the portion 278 defined in a second end 476 of the valve fitting 270. More specifically, the portion 278 of the fluid channel 258 can define a frustoconical cavity defining a conical inner surface angled in cross section by an angle 477 with respect to the central axis 101.

In some aspects, as shown, the sealing element 260 can be a ball, and the auxiliary valve 150 can be a ball valve or, more specifically, a floating ball valve. The sealing element 260 can be positioned inside the fluid channel 258—and, as shown, the portion 278—and can be configured to seal the opening 478. The sealing element 260 can also be configured to allow flow of the fluid of the fluid distribution system 80 through the auxiliary valve 150 when disengaged from the opening 478 and can otherwise be configured to block flow of the fluid through the auxiliary valve 150. Because a surface area of the ball can be less than—and, as shown, significantly less than—a surface area of the main valve 136, dislodging or moving the sealing element 260 can require only a fraction of the operating torque required to open the main valve 136 without the auxiliary valve 150.

In some aspects, as shown, the sealing element 260 can be positioned inside the valve fitting 270 by making the valve fitting 270 separate and removable from a remaining portion of the lower auxiliary valve shaft 220. For example, each of the valve fitting 270 and a remaining portion of the lower auxiliary valve shaft 220 can define respective threaded portions 272,222 configured for a secure but removable connection therebetween. In some aspects, the lower auxiliary valve shaft 320 can be fabricated using less traditional methods such as, for example and without limitation, three-dimensional printing—even using metal or another sufficiently strong material—and the sealing element 260 such as in the form of a deformable ball can be inserted can into the conical cavity or portion 278. Such a deformable ball can be deformable enough to pass through the opening 478 during installation—especially with a concentrated force from a tool or a hand of an installer—but rigid enough to not pass back through the opening 478 under normal operation where a pressure of the fluid of the system 80 is distributed more evenly across a surface of the sealing element. In some aspects, instead of the larger valve fitting 270 as shown a smaller valve fitting 270—such as, for example and without limitation, a seat or cap—can be threaded or otherwise assembled to an extreme axial end of the lower auxiliary valve shaft 220 proximate to the sealing element 260.

The upper auxiliary valve shaft 210 can define an end surface 411 facing the lower auxiliary valve shaft 220. As shown, a diameter 417 of the upper auxiliary valve shaft 210 can be larger at the second end 216 than at the first end 215 (shown in FIG. 2), and the upper auxiliary valve shaft 210 can further define a flange 415 at the second end 216.

The end surface 411 can define a groove 418. As shown, the groove 418 can extend across the second end 216 of the upper auxiliary valve shaft 210 in a direction angled with respect to the central axis 101. More specifically, the noted direction can be angled at 90 degrees with respect to the central axis 101. The groove 418 can be in fluid communication with one of the midstream portion 238 of the fluid channel 258—which can be defined in the upper valve body 138—and a portion (not shown) of the fluid channel 258 defined in the upper auxiliary valve shaft 210. At the same time, the groove 418 can be in fluid communication with the downstream portion 228 of the fluid channel 258. Fluid in the system 80 can thereby flow through the fluid channel 258 from the portion 278, through the groove 418, into the midstream portion 238, and through the upstream portion or upstream portions 438a,b. The groove 418 itself can be considered a portion of the fluid channel 258. In some aspects, the end surface 411 can define a plurality of grooves 418. A bottom surface of each groove 418 can be offset from a surrounding portion of the end surface 411 and thereby define a groove depth, which can be greater or less than shown. Each groove 418 can define a width, which can be greater or less than shown. In some aspects, the groove 418 can define a different shape in cross-section. In some aspects, the end surface 411 can define a single groove. In some aspects, the end surface 411 can define no grooves.

With respect to a portion or portions of the fluid channel 258 such as the upstream portions 438 being defined in the upper auxiliary valve shaft 210, such a portion of the fluid channel 258 can extend between the end surface 411 of the upper auxiliary valve shaft 210 and a portion of the upper auxiliary valve shaft 210 that is in fluid communication with the internal cavity 104 of the hydrant 100. In some aspects, a portion or portions of the fluid channel 258 such as the upstream portions 438 can extend from or along an outer surface 413 of the upper auxiliary valve shaft 210 proximate to or adjacent to the bore 338 and thereby the upper auxiliary valve shaft 210 can direct the fluid in the system 80 from the midstream portion 238 of the fluid channel 258 to the internal cavity 104 of the hydrant 100. More specifically, the fluid of the system 80 can pass around the second end 216, into a first opening and out of a second opening or simply along the portions of the fluid channel 258 defined in the outer surface 413 defined in the upper auxiliary valve shaft 210. In any such aspects, portions of the fluid channel 258 can define internal or external passages or channels in the upper auxiliary valve shaft 210 to permit flow of fluid from a second end or lower end of the auxiliary valve 150 and the valve assembly 130 into the internal cavity 104 of the hydrant 100.

A portion of the auxiliary valve 150 such as the upper valve auxiliary shaft 410 can comprise a protrusion 416 extending along and from and defining the end surface 411. The protrusion can be any shape and can be a ridge or a pin. In some aspects, as shown, the protrusion 416 can be flush with a surrounding portion of the end surface 411. In other aspects, a surface or end surface of the protrusion 416 can extend beyond the surrounding portion of the end surface 411. In some aspects, the upper valve auxiliary shaft 410 can comprise a plurality of protrusions 416. In some aspects, the upper valve auxiliary shaft 410 can comprise a single protrusion 416. In some aspects, the upper valve auxiliary shaft 410 can comprise no protrusions.

The upper valve body 138 can define upstream portions 438a,b of the fluid channel 258. The upstream portions 438a,b can extend from an outer surface 439 of the upper valve body 138 to the midstream portion 238 of the fluid channel 258. The upstream portions 438a,b can be in fluid communication with either of the internal cavity 104 (shown in FIG. 2) of the hydrant 100 (shown in FIG. 2) or the midstream portion 238 or, when not covered or sealed, both of the internal cavity 104 (shown in FIG. 2) of the hydrant 100 (shown in FIG. 2) or the midstream portion 238 of the auxiliary valve 150. Such fluid communication can permit flow of the fluid of the system 80 through the auxiliary valve and into the internal cavity 104. In some aspects, as shown, the flange 415 or another portion of the upper auxiliary valve shaft 210 can block some or all of the upstream portions 438a,b of the fluid channel 258. In other aspects, the upstream portions 438a,b can be in fluid communication with the midstream portion 238 in both open and closed positions of the auxiliary valve 150.

As shown, the upstream portions 438a,b can be offset radially outward from the upper auxiliary valve shaft 210 with respect to the central axis 101. In some aspects, a center of each of the upstream portions 438a,b can be offset radially outward from the upper auxiliary valve shaft 210 by an offset distance 480. In some aspects, the offset distance 480 can be greater than half a bore width or diameter 738 (shown in FIG. 7) of the respective upstream portion 438a,b. In some aspects, the offset distance 480 can be less than half a bore width or diameter of the respective upstream portion 438a,b and can thereby define a slot in the bore 338. In some aspects, the offset distance 480 can be zero or less than zero and the slot in the bore 338 can be, for example and without limitation, semi-circular in a horizontal cross-section.

As shown, the upper auxiliary valve shaft 210 and the lower auxiliary valve shaft 220 can define a gap 432 therebetween in a closed condition of the fluid channel 258. As shown, the sealing element 260 can close an opening such as the opening 478 of the portion 278—or, more broadly, the downstream portion 228—of the fluid channel 258. In such a condition, the sealing element 260 can protrude or extend beyond the first ends 225,475 by an extension distance 434.

Broadly stated, in a closed position of the main valve 136 (shown in FIG. 2) and in a closed condition of the fluid channel 258 as shown (i.e., when each of the main valve 136 and the auxiliary valve 150 is closed), the internal cavity 104 (shown in FIG. 2) of the hydrant 100 (shown in FIG. 2) and the upper end 205 of the valve assembly 130 can be isolated from any fluid of the system 80 in contact with a lower end 206 of the valve assembly 130. More specifically, as shown, when the downstream portions 228,278 of the fluid channel 258 are blocked by the sealing element 260 the fluid channel 258 and the auxiliary valve 150 can be closed. The sealing element 260 can prevent fluid communication between an entrance of the fluid channel 258 defined in the lower auxiliary valve shaft 220 and one of an entrance of the fluid channel 258 defined in the one of the upper auxiliary valve shaft 210 and the upper valve body 138.

Figure 5:
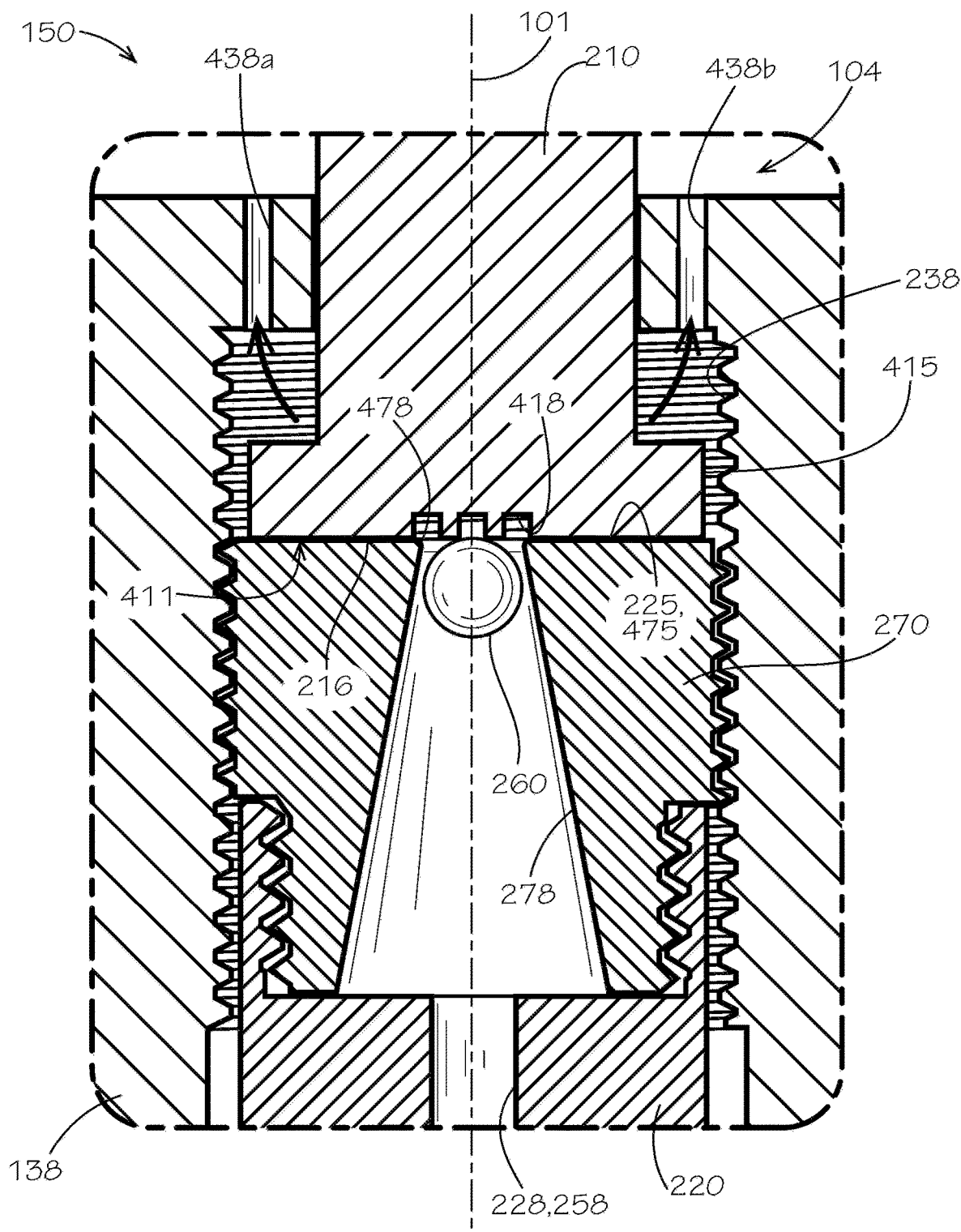
FIG. 5 is a detail sectional view of an auxiliary valve of the valve assembly of FIG. 1 taken from detail 4 of FIG. 1 showing the auxiliary valve in an open condition.

FIG. 5 is a detail sectional view of the auxiliary valve 150 of the valve assembly 130 (shown in FIG. 2) showing the auxiliary valve 150 in an open condition or position. Again, as shown, the grooves 418 can be in fluid communication with the downstream portion 228 of the fluid channel 258 defined in the lower auxiliary valve shaft 220, which in some aspects can be upon movement of the sealing element 260 away from the opening 478.

As shown, the second end 216 and the end surface 411 of the upper auxiliary valve shaft 210 can be in contact with the first end 225 of the lower auxiliary valve shaft 220 and the sealing element 260. Through contact with the sealing element 260, the upper auxiliary valve shaft 210 can move the sealing element 260 from sealing contact with the opening 478. More specifically, as shown, one or more of the aforementioned protrusions 416 can dislodge the sealing element 260 upon contact with the first ends 225,475 by a portion of the end surface 411 surrounding the protrusion 416. In some aspects, one or more of the protrusions 416 can dislodge the sealing element 260 before contact with the first ends 225,475 by a portion of the end surface 411 surrounding the protrusion 416.

In some aspects, the movement of the upper auxiliary valve shaft 210 with respect to the lower auxiliary valve shaft 220 can be permitted and at the same time also restrained within a predetermined range of movement by joining the upper auxiliary valve shaft 210 to the lower auxiliary valve shaft 220 with a coupling (not shown), which can be separate or distinct from the upper valve body 138. Such a coupling can be positioned inside or outside of the upper valve body 138 and in some aspects will not depend on the existence of the upper valve body 138. In some aspects, the movement of the upper auxiliary valve shaft 210 with respect to the lower auxiliary valve shaft 220 can be permitted and at the same time also restrained within a predetermined range of movement by joining the upper auxiliary valve shaft 210 to the lower auxiliary valve shaft 220 with additional structure extending from either or both of the upper auxiliary valve shaft 210 and the lower auxiliary valve shaft 220. For example and without limitation, using traditional or non-traditional (e.g., three-dimensional printing) methods, the midstream portion 238 can be defined by a "cage" or housing extending from one of the upper auxiliary valve shaft 210 and the lower auxiliary valve shaft 220, which can capture or restrain the other of the upper auxiliary valve shaft 210 and the lower auxiliary valve shaft 220.

Broadly stated, in the closed position of the main valve 136 and an open condition of the fluid channel 258 as shown (i.e., when the main valve 136 is closed and the auxiliary valve 150 or the fluid channel 258 is open), the internal cavity 104 of the hydrant 100 can be in fluid communication with any fluid of the system 80 in contact with a lower end 206 of the valve assembly 130. More specifically, as shown, when the upstream portions 438a,b and the downstream portions 228,278 of the fluid channel 258 are opened by moving or lowering the upper auxiliary valve shaft 210 and dislodging the sealing element 260 from the opening of the valve fitting 270, the fluid channel 258 can be open. As shown by the arrows, when the fluid channel 258 is open the fluid of the system 80 can flow into and through the downstream portion 248 (shown in FIG. 2) of the cap nut 140 (shown in FIG. 2) and the fluid channel 258, into and through the downstream portions 228,278, into and through the grooves 418, into and through the midstream portion 238, into and through the upstream portions 438a,b, and then into the internal cavity 104 of the hydrant 100. In some aspects, the first side 235 of the main valve 136 can be configured to be isolated from the second side 236 of the main valve 136 in a closed position of the main valve 136 and a closed condition of the fluid channel 258, and the first side 136 of the main valve 136 can be configured to be in fluid communication with the second side 236 of the main valve 136 in a closed position of the main valve 136 and an open condition of the fluid channel 258.

Figure 6:
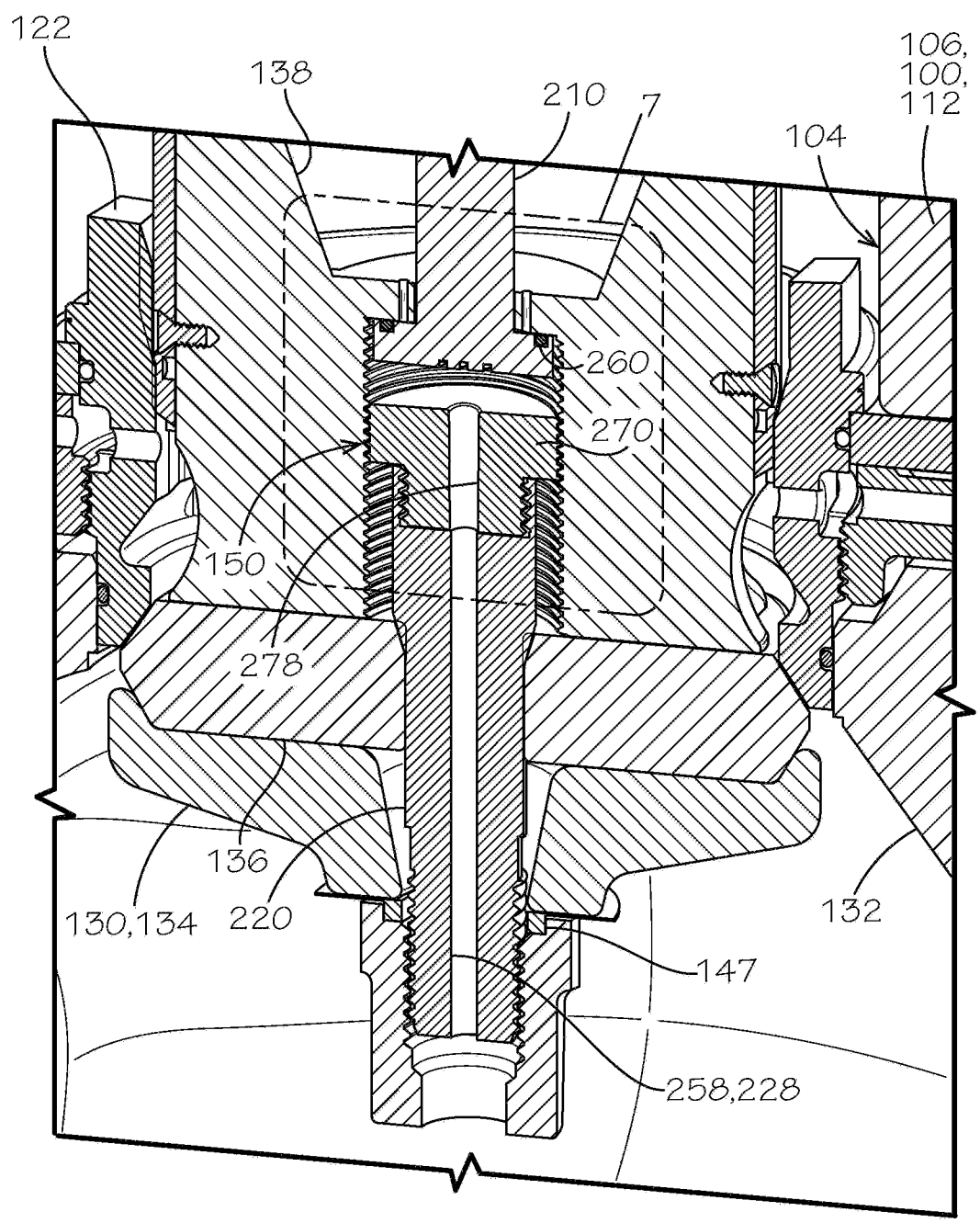
FIG. 6 is a perspective detail sectional view of an auxiliary valve of the valve assembly of FIG. 1 in accordance with another aspect of the current disclosure.

FIG. 6 is a detail sectional view of the auxiliary valve 150 of the valve assembly 130 in accordance with another aspect of the current disclosure. As shown, the sealing element 260 can be positioned in and can be secured to the upper auxiliary valve shaft 210. In some aspects, the sealing element 260 can be positioned in a portion of the upper valve body 138 or another other surrounding structure; for example and without limitation, the sealing element 260 can be positioned in an internal surface or surface 730 (shown in FIG. 7), which as shown in FIG. 7 can be defined in the midstream portion 238 (shown in FIG. 7) of the upper valve body 138.

Figure 7:
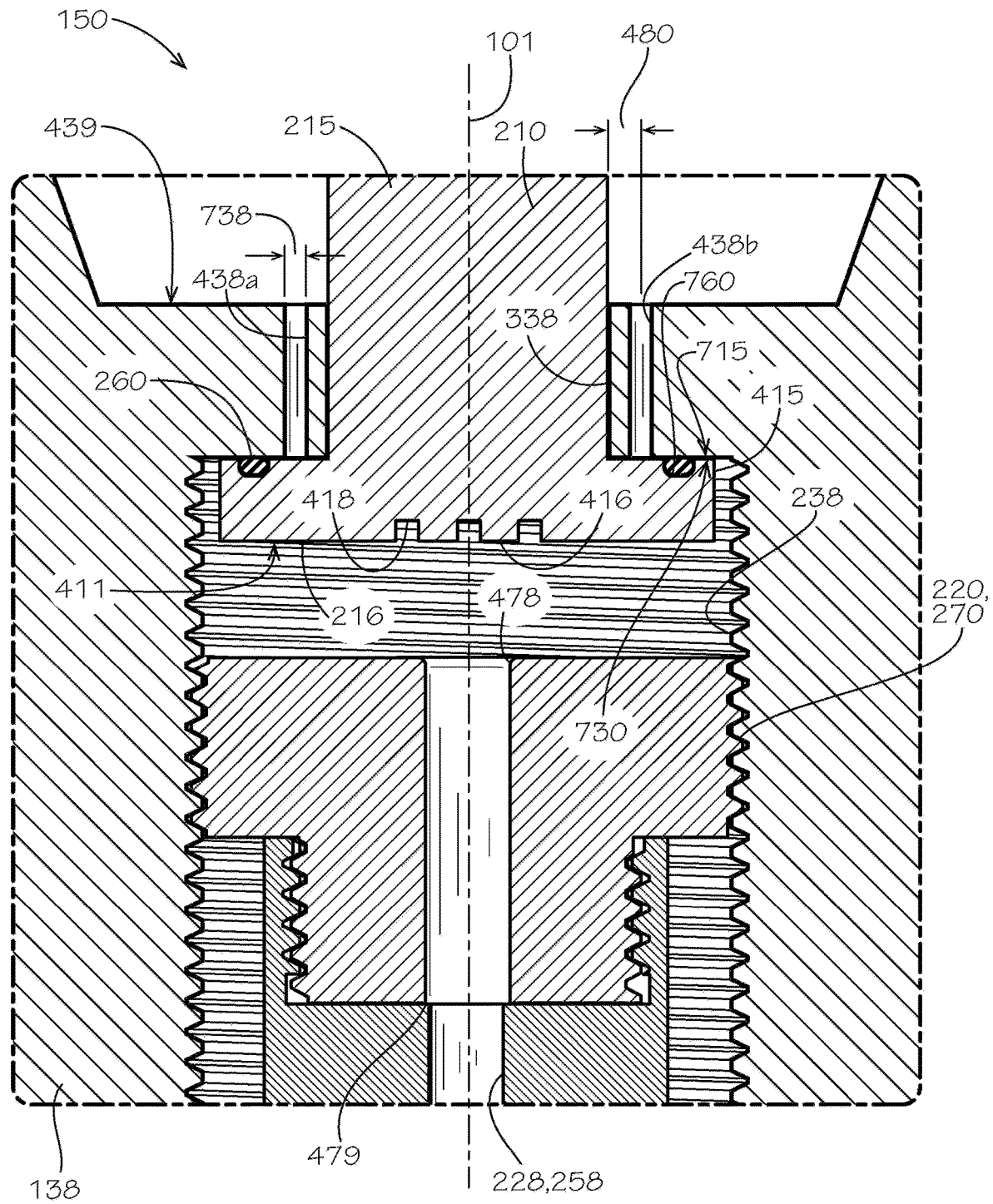
FIG. 7 is a detail sectional view of an auxiliary valve of the valve assembly of FIG. 1 taken from detail 7 of FIG. 6 showing the auxiliary valve in a closed condition.

FIG. 7 is a detail sectional view of the auxiliary valve 150 of the valve assembly 130 showing the auxiliary valve 150 in a closed condition. In some aspects, as shown, the sealing element 260 can be an O-ring defining an annular shape, which can define a circular cross-section, and can be received within a groove 760 defined in a surface 715 of the flange 415 of the upper auxiliary valve shaft 210. In some aspects, the groove 760 can define a dovetail shape in cross-section to facilitate retention of the sealing element 260 therein. In other aspects, the groove 760 can retain the sealing element 260 with the use of a fastener such as, for example and without limitation, adhesive. In some aspects, the sealing element 260 can define a non-annular shape. In some aspects, the sealing element 260 can define a non-circular cross-section. The sealing element can be sealably positioned against the surface 730 and thereby block an entrance to each of the upstream portions 438a,b of the fluid channel 258. The upstream portions 438a,b of the fluid channel 258 can define the width or diameter 738 as shown, which can be greater or less than shown. The fluid channel 258, including the downstream portion 228 defined in the lower auxiliary valve shaft 220, can define a cylindrical surface and can be circular in a horizontal cross-section. In some aspects, without the sealing element 260 the upper auxiliary valve shaft 210 can itself seal the respective entrances to the upstream portions 438a,b or other comparable portions of the fluid channel 258 by, for example, mating surfaces of the upper auxiliary valve shaft 210 and the upper valve body 138 or other comparable structure defining complementary geometry in sealable contact. For example and without limitation, a transition (not shown) between the first end 215 and the flange 415, which can be proximate to the second end 216, of the upper auxiliary valve shaft 210 can define a surface such as the surface 715, which can be flat, as shown, or conical and can match a shape in cross-section of a mating surface such as the surface 730 of the upper valve body 138.

Figure 8:
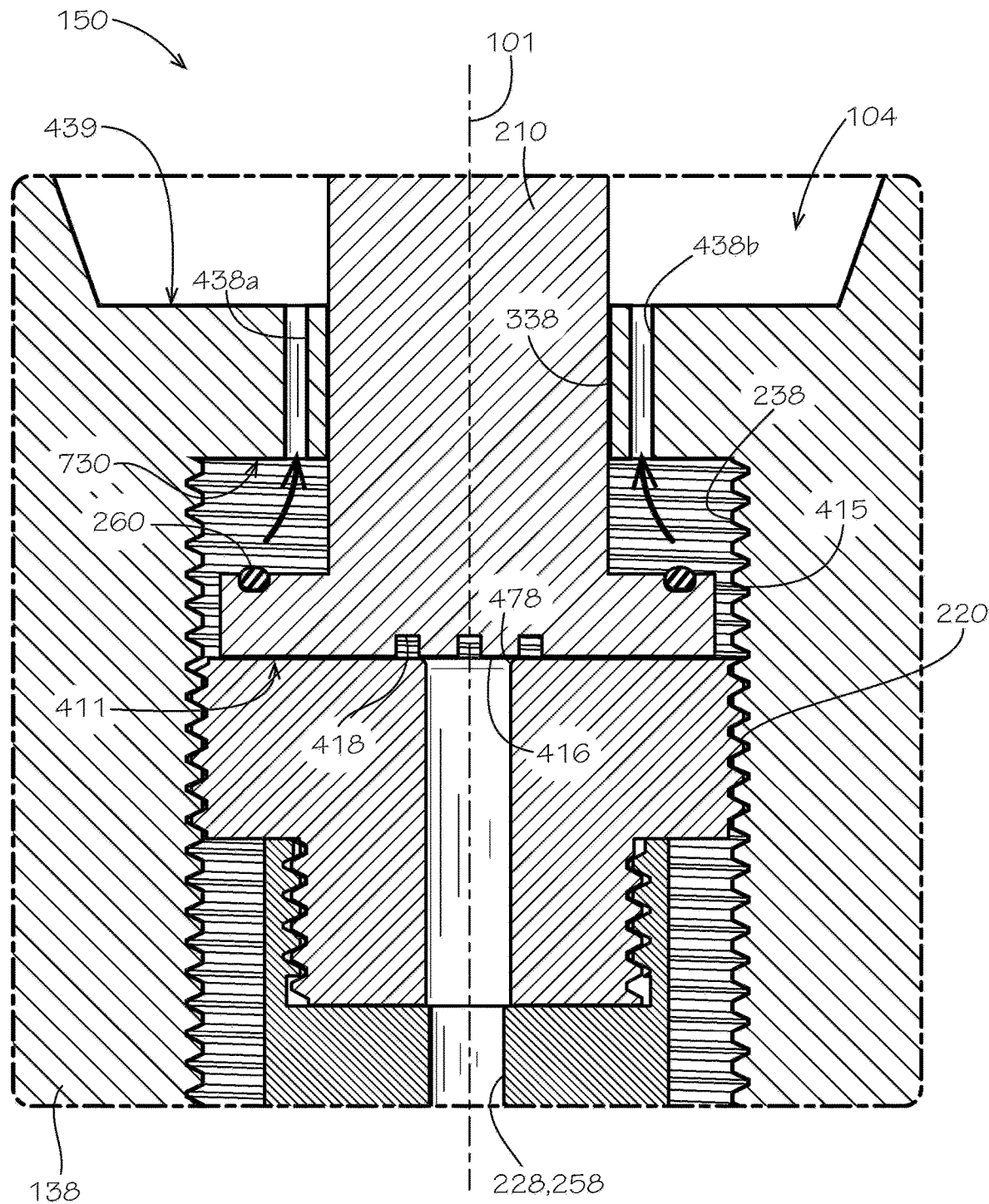
FIG. 8 is a detail sectional view of an auxiliary valve of the valve assembly of FIG. 1 taken from detail 7 of FIG. 6 showing the auxiliary valve in an open condition.

FIG. 8 is a detail sectional view of the auxiliary valve 150 of the valve assembly 130 showing the auxiliary valve 150 in an open condition. Again, as shown, the second end 216 and the end surface 411 of the upper auxiliary valve shaft 210 can be in contact with the first end 225 of the lower auxiliary valve shaft 220. Movement of the upper auxiliary valve shaft 210 away from the surface 730 can move the sealing element 260 from sealing contact with the surface 730. In some aspects, the sealing element 260 can alternately seal against and separate from the mating surface, which can be other than the surface 730 depending on the position of the sealing element 260.

Broadly stated, in the closed position of the main valve 136 and an open condition of the fluid channel 258 as shown (i.e., when the main valve 136 is closed and the auxiliary valve 150 or the fluid channel 258 is open), the internal cavity 104 of the hydrant 100 can be in fluid communication with any fluid of the system 80 in contact with a lower end 206 of the valve assembly 130. More specifically, as shown, when the upstream portions 438a,b and the downstream portions 228,278 of the fluid channel 258 are opened by moving or lowering the upper auxiliary valve shaft 210 and separating the sealing element 260 from the mating surface 730 of the upper valve body 138, the fluid channel 258 can be open. As shown by the arrows, when the fluid channel 258 is open the fluid of the system 80 can flow into and through the downstream portion 248 (shown in FIG. 2) of the cap nut 140 (shown in FIG. 2) and the fluid channel 258, into and through the downstream portions 228,278, into and through the grooves 418, into and through the midstream portion 238, into and through the upstream portions 438a,b, and then into the internal cavity 104 of the hydrant 100.

A method of using the hydrant 100 can comprise moving the upper auxiliary valve shaft 210 of the auxiliary valve 150 of the hydrant 100 in a vertical direction with respect to the lower auxiliary valve shaft 220 of the auxiliary valve 150 of the hydrant 100. The method can comprise opening the fluid channel 258 defined in the auxiliary valve 150. The method can comprise rotating the operating nut 102 at a top end of the hydrant body 106 of the hydrant 100. The method can comprise causing vertical movement of the stem 114 of the hydrant 100 and, thereby, also vertical movement of the upper auxiliary valve shaft 210. Opening the fluid channel 250 can comprise contacting the lower auxiliary valve shaft 220 with the upper auxiliary valve shaft 210. Opening the fluid channel 258 or a portion thereof defined in the upper auxiliary valve shaft 210 can comprise closing the gap 432 (shown in FIG. 4) in an axial direction of the hydrant 100 between the upper auxiliary valve shaft 210 and a facing surface such as the surface 730 of the upper valve body 138 of the hydrant 100. Including when the sealing element 260 is positioned at least partially inside the lower auxiliary valve shaft 220, opening the fluid channel 258 can comprise contacting the sealing element 260 with the upper auxiliary valve shaft 210. The method can comprise waiting until a pressure inside the internal cavity 104 of the hydrant 100 increases or even equalizes with the pressure on the second or lower side of the valve assembly 130.

A user of a particular installed hydrant 100 (shown in FIG. 1) who is not otherwise familiar with the specifications of the hydrant 100 can be notified of the presence of the auxiliary valve 150 by any one or more of the following exemplary structures: a unique shape or other configuration of the operating nut 102 (shown in FIG. 1) that indicates the presence of the auxiliary valve 150 inside the hydrant 100, an identification or instruction or other tag (not shown) on the bonnet 108 (shown in FIG. 1) or other portion of the hydrant 100, or a particular color on all or a portion of the bonnet or other portion of the hydrant 100.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual That which is claimed is:

1. A valve assembly for a hydrant, the valve assembly comprising:
 a main valve defining a bore; and
 an auxiliary valve assembled to and extending through the bore of the main valve, the auxiliary valve defining a fluid channel through the auxiliary valve, the auxiliary valve comprising:
  an upper auxiliary valve shaft;
  a lower auxiliary valve shaft, the upper auxiliary valve shaft movable in a vertical direction with respect to the lower auxiliary valve shaft, a position of the lower auxiliary valve shaft restrained with respect to a position of the upper auxiliary valve shaft within a predetermined movement range; and
  a sealing element preventing fluid flow through the fluid channel.

2. The valve assembly of claim 1, wherein the valve assembly further comprises an upper valve body defining at least a portion of the fluid channel.

3. The valve assembly of claim 2, wherein the upper auxiliary valve shaft defines an end surface facing the lower auxiliary valve shaft and defining a groove, the groove in fluid communication with each of the fluid channel defined in the lower auxiliary valve shaft and the fluid channel defined in the one of the upper auxiliary valve shaft and the upper valve body.

4. The valve assembly of claim 2, wherein the valve fitting defines at least a portion of the fluid channel.

5. The valve assembly of claim 4, wherein an opening at a first end of the portion of the fluid channel defined by the valve fitting is smaller in diameter than an opening at a second end of the valve fitting.

6. The valve assembly of claim 1, wherein the auxiliary valve further comprises a valve fitting defining a first end of the lower auxiliary valve shaft.

7. The valve assembly of claim 1, wherein the fluid channel defined in the lower auxiliary valve shaft defines a cylindrical surface.

8. The valve assembly of claim 1, wherein the sealing element is a ball, the ball positioned inside the fluid channel and configured to seal the entrance of the fluid channel defined in the lower auxiliary valve shaft.

9. The valve assembly of claim 1, wherein the sealing element is secured to the upper auxiliary valve shaft.

10. A hydrant comprising:
 a hydrant body defining an inlet and an outlet and an internal cavity extending from the inlet to the outlet, the inlet connectable to a fluid supply; and
 a valve assembly defining a first end and a second end, the valve assembly comprising:
  a main valve defining a first side and a second side, the main valve configured to prevent flow of a fluid of the fluid supply to the internal cavity from an area in fluid communication with the second end of the valve assembly;
  an auxiliary valve assembled to and extending through the main valve, the auxiliary valve defining a fluid channel therethrough, the auxiliary valve comprising:
   an upper auxiliary valve shaft; and
   a lower auxiliary valve shaft, the upper auxiliary valve shaft movable within a predetermined range of movement in a vertical direction with respect to the lower auxiliary valve shaft.

11. The hydrant of claim 10, wherein:
 the first side of the main valve is isolated from the second side of the main valve when each of the main valve and the fluid channel is closed; and
 the first side of the main valve is in fluid communication with the second side of the main valve when the main valve is closed and the fluid channel is open.

12. The hydrant of claim 10, further comprising an upper valve body in contact with the first side of the main valve, the upper auxiliary valve shaft extending through the upper valve body.

13. The hydrant of claim 10, wherein the upper auxiliary valve shaft and the lower auxiliary valve shaft define a gap therebetween in a closed condition of the fluid channel.

14. The hydrant of claim 10, further comprising a stem extending from a top end of the hydrant to the upper auxiliary valve shaft.

15. The hydrant of claim 14, further comprising an operating nut configured to cause vertical movement of the stem upon rotation of the operating nut.

16. A method of using a hydrant, the method comprising:
 moving an upper auxiliary valve shaft of an auxiliary valve of the hydrant in a vertical direction with respect to a lower auxiliary valve shaft of the auxiliary valve of the hydrant; and
 opening a fluid channel defined in the auxiliary valve, the auxiliary valve extending through a main valve of the hydrant and a fluid of the system able to thereby flow through the auxiliary valve.

17. The method of claim 16, further comprising rotating an operating nut at a top end of a hydrant body of the hydrant so as to cause vertical movement of a stem of the hydrant, the stem coupled to the upper auxiliary valve shaft.

18. The method of claim 16, wherein opening the fluid channel comprises contacting the lower auxiliary valve shaft with the upper auxiliary valve shaft.

19. The method of claim 16, wherein opening the fluid channel defined in the upper auxiliary valve shaft comprises opening a gap in an axial direction of the hydrant between the upper auxiliary valve shaft and a facing surface of an upper valve body of the hydrant.

20. The method of claim 16, wherein a sealing element is positioned at least partially inside the lower auxiliary valve shaft, and wherein opening the fluid channel defined in the lower auxiliary valve shaft comprises contacting the sealing element with the upper auxiliary valve shaft.

* * * * *